US009114792B2

(12) United States Patent
Bieltz et al.

(10) Patent No.: US 9,114,792 B2
(45) Date of Patent: Aug. 25, 2015

(54) METHOD FOR SETTING THE CLAMPING FORCE EXERTED BY A PARKING BRAKE

(75) Inventors: Karsten Bieltz, Mudelsheim (DE); Simon Hauber, Freiberg am Neckar (DE)

(73) Assignee: ROBERT BOSCH GMBH, Stuttgart (DE)

(*) Notice: Subject to any disclaimer, the term of this patent is extended or adjusted under 35 U.S.C. 154(b) by 9 days.

(21) Appl. No.: 13/994,513

(22) PCT Filed: Dec. 5, 2011

(86) PCT No.: PCT/EP2011/071777
§ 371 (c)(1), (2), (4) Date: Aug. 27, 2013

(87) PCT Pub. No.: WO2012/080025
PCT Pub. Date: Jun. 21, 2012

(65) Prior Publication Data

US 2013/0333988 A1 Dec. 19, 2013

(30) Foreign Application Priority Data

Dec. 17, 2010 (DE) ........................ 10 2010 063 404

(51) Int. Cl.
*B60T 13/58* (2006.01)
*B60T 7/04* (2006.01)
*B60T 7/10* (2006.01)
*B60T 13/74* (2006.01)

(52) U.S. Cl.
CPC ................. *B60T 13/58* (2013.01); *B60T 7/042* (2013.01); *B60T 7/045* (2013.01); *B60T 7/107* (2013.01); *B60T 13/588* (2013.01); *B60T 13/741* (2013.01)

(58) Field of Classification Search
CPC ........... B60T 7/42; B60T 7/45; B60T 13/588; B60T 13/741
USPC ..................... 303/9.61, 11, 155, 191, 192, 89
See application file for complete search history.

(56) References Cited

U.S. PATENT DOCUMENTS 5,979,619 A * 11/1999 Rump ........................... 188/353
6,311,808 B1 11/2001 Halasy et al.
7,681,961 B2 * 3/2010 Nonaga et al. ................ 303/155
8,521,388 B2 * 8/2013 Baehrle-Miller et al. ...... 701/70
2006/0186731 A1 * 8/2006 Bach .............................. 303/89
2006/0267402 A1 * 11/2006 Leiter et al. ..................... 303/20
2011/0042171 A1 * 2/2011 Knechtges ................ 188/106 F

FOREIGN PATENT DOCUMENTS

DE 103 45 485 4/2005
DE 103 61 042 5/2005
JP 2007-519568 7/2007

OTHER PUBLICATIONS

International Search Report for PCT/EP2011/071777, dated May 25, 2012.

* cited by examiner

*Primary Examiner* — Bradley King
(74) *Attorney, Agent, or Firm* — Kenyon & Kenyon LLP

(57) ABSTRACT

In a method for setting the clamping force exerted by a parking brake, which is generated at least partially by an electromechanical braking device and, if needed, in supplementary fashion by a hydraulic braking device, in the provision of the hydraulic clamping force, a boost pressure to be generated in the hydraulic braking device is increased with respect to a switch-off pressure at the switch-off time that corresponds to the hydraulic clamping force.

10 Claims, 2 Drawing Sheets

METHOD FOR SETTING THE CLAMPING FORCE EXERTED BY A PARKING BRAKE

BACKGROUND OF THE INVENTION

1. Field of the Invention

The present invention relates to a method for setting the clamping force exerted by a parking brake in a vehicle.

2. Description of the Related Art

Published German patent document DE 103 61 042 B3 describes an electromechanical parking brake having an electric brake motor as actuator, which upon activation adjusts a brake piston, which bears a brake lining, axially in the direction of a brake disk. The magnitude of the electromechanical brake force may be adjusted via the supply of current to the brake motor.

It is furthermore known to couple electromechanical parking brakes with a hydraulic vehicle brake, in that the brake piston of the parking brake additionally has hydraulic pressure applied to it such that the total clamping force to be set is composed of an electromechanical portion and a hydraulic portion. The hydraulic portion of the clamping force is provided as needed and in supplementary fashion to the electromechanical portion. For a precise setting of the clamping force it is necessary to know the hydraulic clamping force boost as precisely as possible.

BRIEF SUMMARY OF THE INVENTION

The present invention is based on the objective of providing, by simple measures, the clamping force in a parking brake having an electromechanical braking device with additional hydraulic boost at sufficient accuracy.

The method according to the present invention relates to an electromechanical parking brake in a vehicle, which has an electric actuator, via which a clamping force is able to be generated for arresting the vehicle at standstill. The electromechanical actuator is preferably an electric brake motor, the rotational motion of which is translated into an axial actuating motion of a brake piston which bears a brake lining and is pressed against a brake disk. Fundamentally, however, other electric actuators could also be considered as well, for example electromagnetic actuators.

The clamping force is fundamentally set at least in part by the electromechanical actuator. As required and in supplementary fashion, a portion of the clamping force may also be generated by a hydraulic braking device, the hydraulic braking pressure of which preferably also acts on the brake piston and thereby boosts the electromechanical clamping force. If the hydraulic braking device becomes active, then the total clamping force is composed of an electromechanical portion and a hydraulic portion.

The hydraulic braking device is preferably the regular hydraulic vehicle brake.

In a simultaneous activation of the electrical actuator for generating an electromechanical clamping force and of the hydraulic braking device for generating a hydraulic clamping force, these brake systems come to influence each other reciprocally. The forward motion of the brake piston enlarges the space for the hydraulic volume, which is associated with a drop in hydraulic pressure. According to the present invention, in a supplementary hydraulic clamping force boost, a boost pressure to be produced in the hydraulic braking device is generated, which is increased by an application-specific pressure value with respect to the pressure at the time of switch-off. At the switch-off time, the electrical actuator is switched off, thereby freezing the total clamping force generated, a control element of the actuator being locked or persisting in its current position.

The increase of the boost pressure to be provided by the hydraulic braking device by the application-specific pressure value compensates for the pressure drop that occurs during the blocking motion of the brake piston in the direction of the brake disk due to the volume enlargement. The pressure value by which the boost pressure is increased takes on a constant value, independent of the absolute pressure level in the hydraulic braking device. This makes it possible to ascertain in advance the pressure value for the respective parking brake by which the hydraulic pressure typically decreases in the forward motion of the brake piston. Since the pressure drop for the respective parking brake is always constant, the corresponding pressure value may be taken into account independently of the currently prevailing pressure level by addition to the switch-off pressure, which provides the hydraulic clamping force portion. For example, if a specific hydraulic clamping force portion of the total clamping force is requested, the hydraulic clamping force portion being determined from the hydraulic switch-off pressure, then the pressure value may be added to the known switch-off pressure in order to obtain the boost pressure that must be generated by the hydraulic braking device.

One expedient variant provides for a hydraulic initial pressure applied by the driver by operating the brake pedal to be also subtracted from the switch-off pressure to be provided. In order to attain the desired switch-off pressure, it is only necessary to generate a boost pressure that is reduced by the value of the initial pressure.

The hydraulic boost pressure may either be provided or generated already prior to the generation of the electromechanical clamping force or only after activating the electromechanical braking device. If the boost pressure is already set prior to activating the electromechanical braking device, then overall a greater time period is available for the pressure buildup, which is associated with a lower hydraulic pump performance and lower noise generation. If, on the other hand, the hydraulic boost pressure is generated only after activating the electromechanical braking device, then indeed only a shorter time period is available for generating the pressure, which is associated with a higher pump performance and a greater noise generation. However, the pressure buildup may be scheduled in an idling or free travel phase of the electromechanical braking device, whereby the overall time period for providing the total clamping force is reduced.

It may be expedient to take pressure tolerances into account when providing the hydraulic boost pressure, which stem from model or measurement inaccuracies for example. The boost pressure is increased by the value of the pressure tolerance in order to ensure that the required switch-off pressure is attained.

The method according to the present invention runs in a closed-loop or open-loop control unit in the vehicle, which may be a component of the parking brake system.

DETAILED DESCRIPTION OF THE INVENTION

Figure 1:
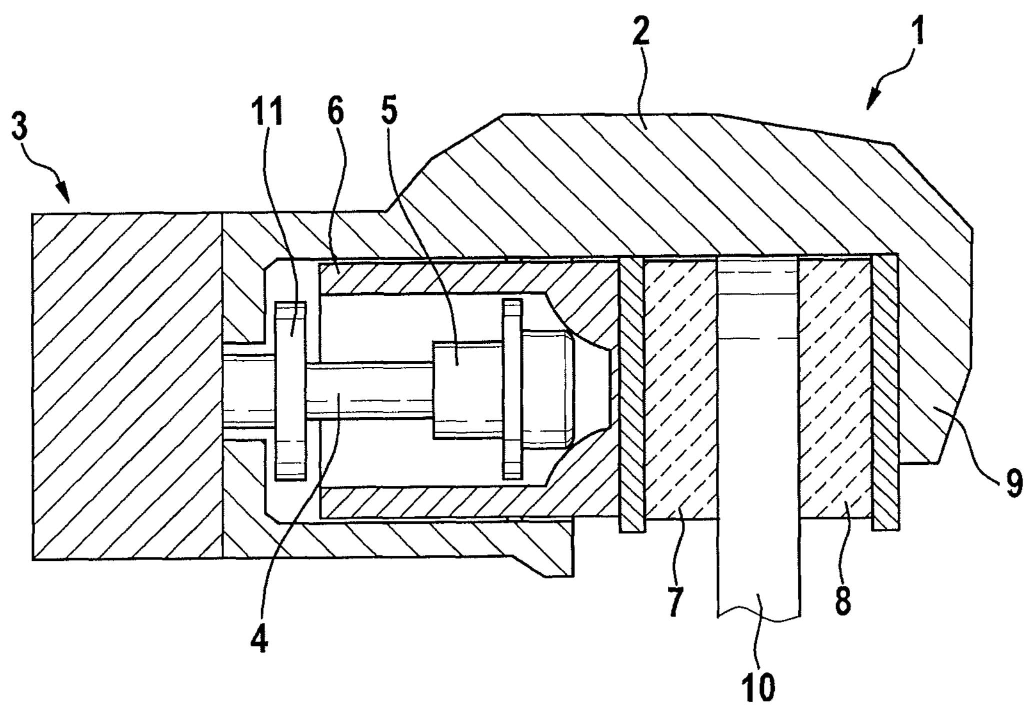
FIG. 1 shows a section through an electromechanical parking brake for a vehicle, in which the clamping force is generated via an electric brake motor.

FIG. 1 shows an electromechanical parking brake 1 for arresting a vehicle at a standstill. Parking brake 1 includes a brake caliper body 2 having a caliper 9 that reaches over a brake disk 10. As a controlling element, parking brake 1 has an electric motor as brake motor 3, which rotates a spindle 4, on which a spindle component 5 is rotationally mounted. In a rotation of spindle 4, spindle component 5 is axially adjusted. Spindle component 5 moves within a brake piston 6, which bears a brake lining 7, which is pressed by brake piston 6 against brake disk 10. On the opposite side of brake disk 10, there is another brake lining 8, which is held in a stationary manner on caliper 9.

Within brake piston 6, spindle component 5 is able to move axially forward in the direction of brake disk 10 when spindle 4 is rotated or is able to move axially backward until reaching a stop 11 when spindle 4 is rotated in the opposite direction. In order to generate a clamping force, spindle component 5 applies force on the inner front side of brake piston 6, whereby brake piston 6 supported in parking brake 1 in axially displaceable fashion is pressed with brake lining 7 against the facing side of brake disk 10.

If necessary, the parking brake may be boosted by a hydraulic vehicle brake such that the clamping force is composed of an electromotive portion and a hydraulic portion. In the hydraulic boost, the backside of brake piston 6 facing the brake motor has pressurized hydraulic fluid applied to it.

Figure 2:
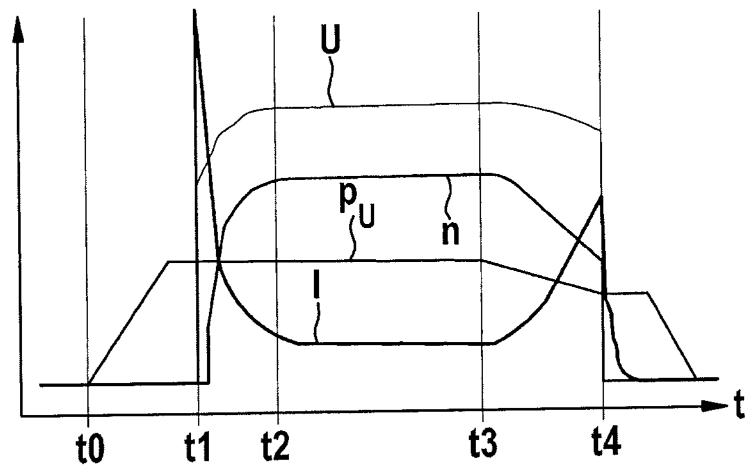
FIG. 2 shows a diagram showing a time-dependent curve of the current, the voltage and the motor speed during the process of applying the parking brake as well as a hydraulic pressure from a hydraulic braking device, the hydraulic pressure being provided prior to the generation of the electromechanical clamping force.
Figure 3:
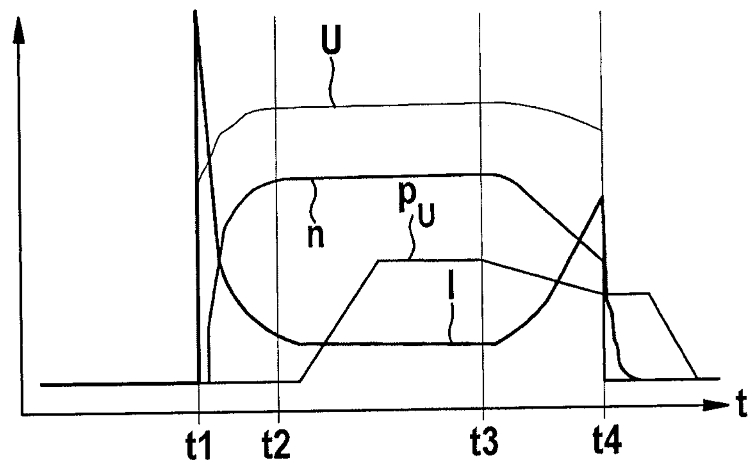
FIG. 3 shows a diagram corresponding to FIG. 2, the hydraulic pressure only being generated in a free travel phase of the electromechanical braking device during the blocking process.

FIGS. 2 and 3 respectively show a diagram of current curve 1, voltage U and rotational speed curve n of the electric brake motor as a function of time for a brake application process. The brake application process begins at time t1 in that an electrical voltage is applied and the brake motor is supplied with current in a closed electric circuit. At time t2, voltage U and motor speed n have reached their maximum. The phase between t2 and t3 represents the idling phase, in which current 1 is at a minimum level. This is followed, beginning at time t3 and ending at time t4, by the force buildup phase, in which the brake linings contact the brake disk and are pressed with increasing clamping force F against the brake disk. At time t4, the electrical brake motor is switched off by opening the electric circuit such that in the further course the speed n of the brake motor drops to zero.

The point of rise of the force coincides with the phase of the force buildup at time t3. The force buildup or the curve of clamping force F may be ascertained, for example, on the basis of the curve of current 1 of the brake motor, which fundamentally has the same curve as the electromechanical clamping force. Starting from the low level during the idling phase between t2 and t3, the current curve rises sharply at the beginning of time t3. This rise in the current may be detected and used to determine the point of rise of the force. Fundamentally, however, the curve of the force buildup may also be determined from the voltage or rotational speed curve or from any combination of the signals of current, voltage and rotational speed.

FIGS. 2 and 3 additionally shows the curve for a boost pressure $p_U$, which is generated by the hydraulic braking device in order to generate, in addition to the electromechanical clamping force, a hydraulic clamping force, which is added to the electromechanical clamping force to form the total clamping force. A hydraulic pressure is set via the vehicle brake, which acts on the backside of the brake piston and boosts the electromechanically provided clamping force. The boost pressure $p_U$, which must be generated by the hydraulic braking device in order to attain a specific requested hydraulic clamping force, is accordingly $$p_U = p_{t,off} + \Delta p + p_{tol} - p_{initial}$$

additively composed of a switch-off pressure $p_{t,off}$, a pressure value $\Delta p$ and a tolerance pressure $p_{tol}$. In addition, the initial pressure $p_{initial}$ in the hydraulic system is taken into account, which is applied by the driver via a brake pedal operation at the time of the blocking of the electric brake motor; the initial pressure $p_{initial}$ is subtracted since via the boost pressure only the difference between the initial pressure and the absolute pressure level to be attained must be generated. The switch-off pressure $p_{t,off}$ is the pressure acting on the brake piston at the time when the electric brake motor is switched off, which corresponds directly to the hydraulic clamping force. $\Delta p$ represents a constant pressure value, which characterizes the pressure drop occurring in the hydraulic system due to the forward motion of the brake piston during the blocking process and the associated volume enlargement. Pressure drop $\Delta p$ is always constant for the respective vehicle brake independently of the pressure level, and lies for example in a value range between 10 bar and 20 bar. Model and measurement inaccuracies may be taken into account via the pressure tolerance $p_{tol}$.

The curve of the boost pressure $p_U$ shown in FIGS. 2 and 3 also corresponds to switch-off pressure $p_{t,off}$. As may be gathered from FIG. 2, in a first variant of an embodiment the boost pressure $p_U$ is set already prior to activating the electric brake motor. For this purpose, boost pressure $p_U$ rises already at a time t0, which is before time t1, at which the application process starts in the electromechanical braking system. Boost pressure $p_U$ is reached already at time t1 and is maintained until time t3, at which the force buildup occurs in the electromechanical braking system. Boost pressure $p_U$ drops until time t4—the switch-off time—, which is due to the volume enlargement resulting from the advancing motion of the brake piston. The pressure drop in the curve of $p_U$ between time t3 and time t4 corresponds to the pressure value $\Delta p$.

In the variant of an embodiment shown in FIG. 3, boost pressure $p_U$ in the hydraulic braking device is generated only during the idling phase between time t2 and time t3. The pressure buildup begins after time t2, and ends prior to the termination of the idling phase at time t3 once the full boost pressure $p_U$ is attained. In the force buildup phase between time t3 and time t4, as in FIG. 2, the pressure level of boost pressure $p_U$ drops again due to the volume enlargement. Switch-off pressure $P_{t,off}$ is reached at time t4.

What is claimed is:

1. A method for controlling a clamping force exerted by a parking brake, comprising:

generating at least a first portion of the clamping force as an electromechanical clamping force by an electromechanical braking device having an electric brake motor; and generating a second portion of the clamping force as a hydraulic clamping force by a hydraulic braking device, wherein the hydraulic braking device applies a hydraulic pressure acting on a brake piston in a boosting fashion;

wherein, in providing the hydraulic clamping force, a boost pressure $p_U$ to be generated in the hydraulic braking device is increased by a constant pressure value $\Delta p$ with respect to a switch-off pressure $P_{t,off}$ at a switch-off or blocking time of the electric brake motor, and wherein the boost pressure $p_U$, which is generated by the hydraulic braking device to attain a specific hydraulic clamping force, is $$p_U = p_{t,off} + \Delta p + p_{tol} - p_{initial}$$

which includes the switch-off pressure $p_{t,off}$, the constant pressure value Δp and a tolerance pressure $p_{tol}$, and wherein $p_{initial}$ is an initial pressure in the hydraulic system, which is applied by the driver via a brake pedal operation at the time of the blocking of the electric brake motor, and wherein the constant pressure Δp characterizes a pressure drop occurring in the hydraulic system due to a forward motion of the brake piston during the blocking and an associated volume enlargement.

2. The method as recited in claim 1, wherein the hydraulic boost pressure is provided prior to the generation of the electromechanical clamping force.

3. The method as recited in claim 1, wherein the hydraulic boost pressure is generated only after the activation of the electromechanical braking device.

4. The method as recited in claim 3, wherein the hydraulic boost pressure is provided in an idling phase of operating the electromechanical braking device.

5. The method as recited in claim 2, wherein the constant pressure value is between 10 bar and 20 bar.

6. A control unit for controlling a clamping force exerted by a parking brake, comprising:

a first controlling arrangement to control generation of at least a first portion of the clamping force as an electromechanical clamping force by an electromechanical braking device having an electric actuator; and a second controlling arrangement to control generation of a second portion of the clamping force as a hydraulic clamping force by a hydraulic braking device, wherein the hydraulic braking device applies a hydraulic pressure acting on a brake piston in a boosting fashion;

wherein, in providing the hydraulic clamping force, a boost pressure $p_U$ to be generated in the hydraulic braking device is increased by a constant pressure value Δp with respect to a switch-off pressure $p_{t,off}$ at a switch-off or blocking time of the electric brake motor, and wherein the boost pressure $p_U$, which is generated by the hydraulic braking device to attain a specific hydraulic clamping force, is $$p_U = p_{t,off} + \Delta p + p_{tol} - p_{initial}$$

which includes the switch-off pressure $p_{t,off}$ the constant pressure value Δp and a tolerance pressure $p_{tol}$, and wherein $p_{initial}$ is an initial pressure in the hydraulic system, which is applied by the driver via a brake pedal operation at the time of the blocking of the electric brake motor, and wherein the constant pressure Δp characterizes a pressure drop occurring in the hydraulic system due to a forward motion of the brake piston during the blocking and an associated volume enlargement.

7. The control unit as recited in claim 6, wherein the hydraulic boost pressure is provided prior to the generation of the electromechanical clamping force.

8. The control unit as recited in claim 6, wherein the hydraulic boost pressure is generated only after the activation of the electromechanical braking device.

9. The control unit as recited in claim 8, wherein the hydraulic boost pressure is provided in an idling phase of operating the electromechanical braking device.

10. The control unit as recited in claim 7, wherein the constant pressure value is between 10 bar and 20 bar.

* * * * *